United States Patent [19]
Kurita

[11] Patent Number: 6,018,138
[45] Date of Patent: Jan. 25, 2000

[54] FLOOR-HEATING METHOD AND RADIATING PIPE FOR USE IN FLOOR HEATING

[75] Inventor: Yasuo Kurita, Aichi, Japan

[73] Assignee: Kurita Kogyo Co., Ltd., Japan

[21] Appl. No.: 08/938,422

[22] Filed: Sep. 25, 1997

[30] Foreign Application Priority Data

Sep. 27, 1996 [JP] Japan .................................. 8-256939

[51] Int. Cl.$^7$ .............................. H05B 1/00; B60H 1/22
[52] U.S. Cl. ............................................. 219/213; 237/45
[58] Field of Search ............................ 219/213; 104/15; 138/33, 32; 237/46

Primary Examiner—Philip H. Leung
Assistant Examiner—Daniel L. Robinson
Attorney, Agent, or Firm—Morrison Law Firm

[57] ABSTRACT

A radiating pipe disposed in a floor for heating the floor includes an outer pipe and an inner pipe, a heating cable passing through the inner pipe and the space between the inner pipe and the outer pipe being an empty air space. Optionally, materials such as sand, rock particles, a mixture or sand and rock particles, and concrete can be sealed in the empty air space. The inner pipe and the outer pipe can or at least one such pipe can be a copper pipe and the two pipes can be formed as an integral structure.

6 Claims, 6 Drawing Sheets

FLOOR-HEATING METHOD AND RADIATING PIPE FOR USE IN FLOOR HEATING

BACKGROUND OF THE INVENTION

The present invention relates to a floor-heating method and radiating pipe for use in floor heating.

In conventional floor-heating methods and floor-heating devices, a heated thermal medium is circulated through long, thin seamless pipes installed under a floor. Alternatively, a powered heating cable is installed under a floor. In the system involving circulation of a heating medium, a circulation path for the heating medium is disposed under the floor. The circulation path comprises seamless pipes made from a material having good thermal conductivity. The pipes are installed under the floor using embedding panels. A boiler is disposed outside the circulation path in order to heat the heating medium in the seamless pipes. A pump is also disposed in the circulation path to force the heating medium to circulate. In the system involving heating cables, it is necessary to form the floor surface using concrete in order to fix the heating cable.

However, in the system involving circulation of a heating medium, the temperature of the heated medium gradually decreases as it circulates in the seamless pipes. Temperature at the portion of the floor corresponding to the front half of the circulation path (near the boiler) will be high. However, the temperature of the floor corresponding to the rear half (away from the boiler) will not rise. Thus, it is not possible to provide uniform heating for the entire floor.

Also, since a pump is used to circulate the heating medium inside the seamless pipes, a large pump may be required if the circulation path is long or if the heating medium is a viscous material. The use of a smaller pump will put an excessive load on the pump, requiring large expenditures for maintenance.

Furthermore, since a boiler is used to heat the heating medium, the boiler will generally heat an entire tank containing the heating medium. Thus, the boiler loses a significant amount of thermal energy in heating the portion of the heating medium that will not be circulating. Also, heat is dissipated in the process of medium reaching the circulation path, and this results in heat loss that increases the operation costs of the system.

The seamless pipes installed under the floor will generally be made of copper. These pipes must be bent manually to form the circulation path. Thus, an experienced operator is required in installing the seamless pipes, and the installation will also be time consuming. This results in the entire installation of the floor-heating system being slow and expensive.

In systems that use heating cables, the heat dissipated from the heating cable is not efficiently transferred to the floor surface for reasons that are not clearly understood. Since the floor cannot be heated to a desired temperature, it is difficult to have the system provide heating at the predicted temperature. If the voltage or the current going to the heating cable is increased in order to force the temperature higher, greater power consumption will make the operating costs extremely high. Furthermore, since the positionings of the heating cables have to be fixed in concrete, this system can only be used when the floor is laid with concrete, making this method impractical for general home use.

In response to these problems, the present applicant developed a floor-heating system that uses a two-layer pipe structure, as described in published Japanese patent application 7-121449. In this technology, two-layer pipe structures are installed parallel to each other. The inner space of the two-layer pipe structures are made continuous, and water or a heating medium is sealed in this inner space. A heating body is passed through the inner pipe of the two-layer pipe structure.

This technology allows relatively easier floor-heating installation. However, the amount of work required for installation is still significant, and the method is not suited for situations where installation must be performed in a short period of time, such as for remodelling. Also, since water or the like is sealed in the inner space of the two-layer pipe structures, there is a need for adequate water-tightness.

OBJECTS AND SUMMARY OF THE INVENTION

The object of the present invention is to overcome the problems described above. A further object of the invention is to provide a floor-heating method and a radiating pipe for floor heating that can decrease the amount of work involved in installation, thus making it possible to perform installation in a short period of time. A further object of the invention is to eliminate the need for water-tightness.

The present invention relates to a floor-heating method wherein a radiating pipe is disposed at a prescribed position under a floor. The radiating pipe comprises a layer of air and a heating cable is loosely inserted through the radiating pipe.

The present invention also relates to a floor-heating method wherein a radiating pipe is disposed at a prescribed position under a floor. The radiating pipe comprises: an inner pipe through which a heating cable is loosely inserted; and a middle layer of air formed by the hollow space between the inner pipe and an outer pipe.

The present invention also relates to a radiating pipe for floor heating comprising an inner pipe having an inner diameter through which a heating cable can be loosely inserted, and an outer pipe that surrounds the inner pipe and a hollow section formed between the inner pipe and the outer pipe. The inner pipe and the outer pipe are formed integrally.

Furthermore, it would be desirable to seal sand in the hollow section. Alternatively, rock particles, a mixture of sand and rock particles, or concrete can be used. Furthermore, it would be desirable to have the inner pipe and/or the outer pipe made from copper.

DETAILED DESCRIPTION OF THE PREFERRED EMBODIMENTS

Figure 1:
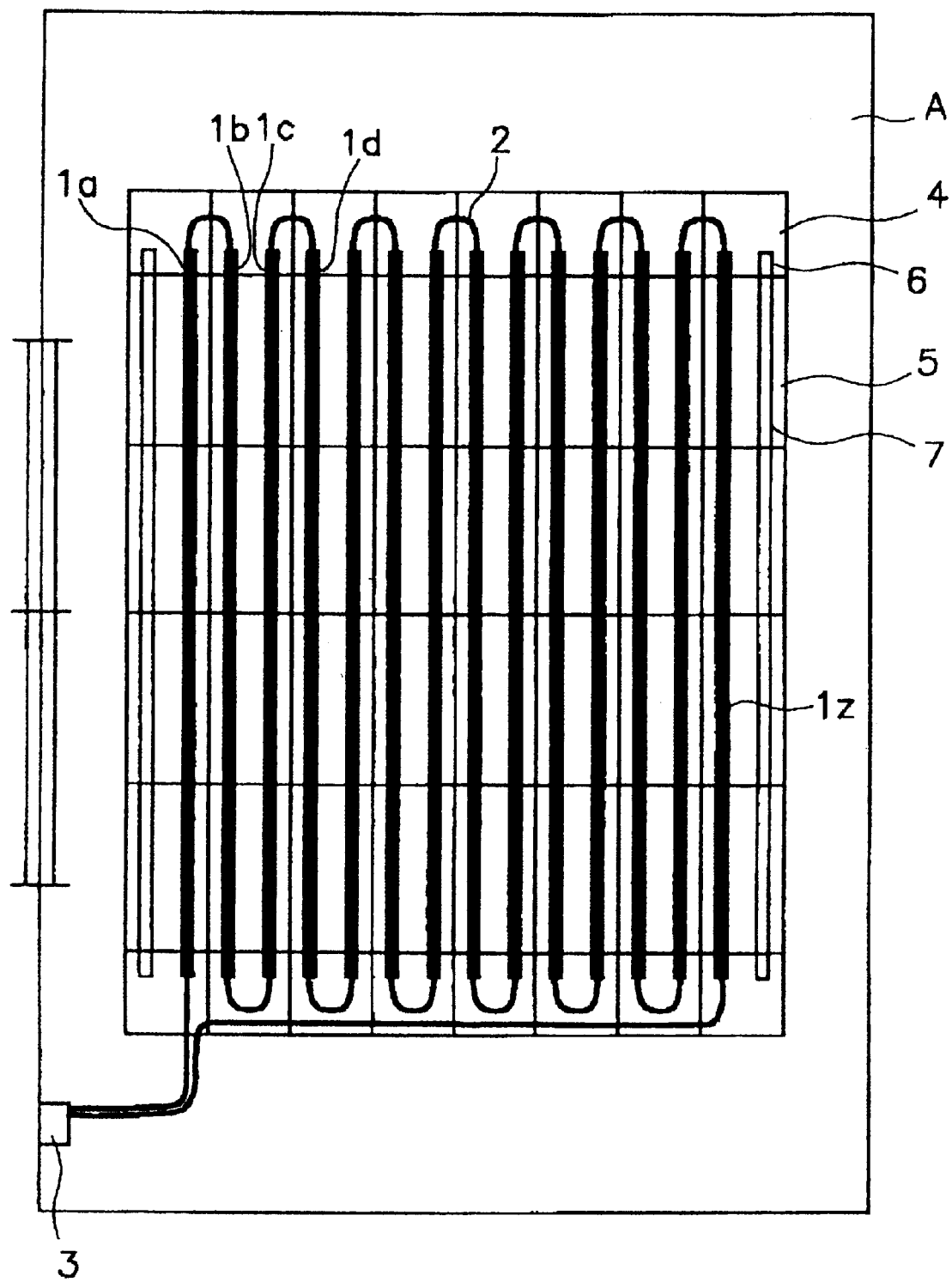
FIG. 1 is a schematic plan view of a floor heated by the method and using a heat radiating pipe of the invention.

Referring to the drawings, the following is a description of embodiments of the present invention. Referring to FIG.

1, in an embodiment of the floor-heating method, radiating pipes 1a, 1b, 1c, 1d, ... 1z are disposed parallel to each other over a prescribed area in a room A. A heating cable 2 is loosely inserted through radiating pipes 1a, 1b, 1c, 1d, ... 1z. Heating cable 2 is loosely inserted continuously through the radiating pipes, beginning with radiating pipe 1a in the first row (the left end in the drawing) and all the way to radiating pipe 1z in the last row (the right end in the drawing). By supplying electricity to heating cable 2, the resulting heat is transferred to the floor via radiating pipes 1a, 1b, 1c, 1d, ... 1z and the prescribe area of room A is heated.

A power supply 3 is connected to heating cable 2 to provide electricity. A switch and a controller (not shown in the drawings) are also connected. The switch is used to turn on the electricity and begin heating, and the controller is used to turn power supply 3 on and off to adjust the room temperature. This adjustment can also be managed with a control device working in conjunction with a temperature sensor.

Radiating pipes 1a, 1b, ... 1z are not installed over the entire area of the floor of room A. Pipes are not installed at the edges and corners of the room, where heating is believed to be unnecessary. A square panel 4 or a rectangular panel 5 is installed in an area where heating is desired, and radiating pipes 1a, 1b, ... 1z are fitted in grooves 6, 7 of panels 4, 5. This allows the pipes to be installed at prescribed positions.

Figure 2:
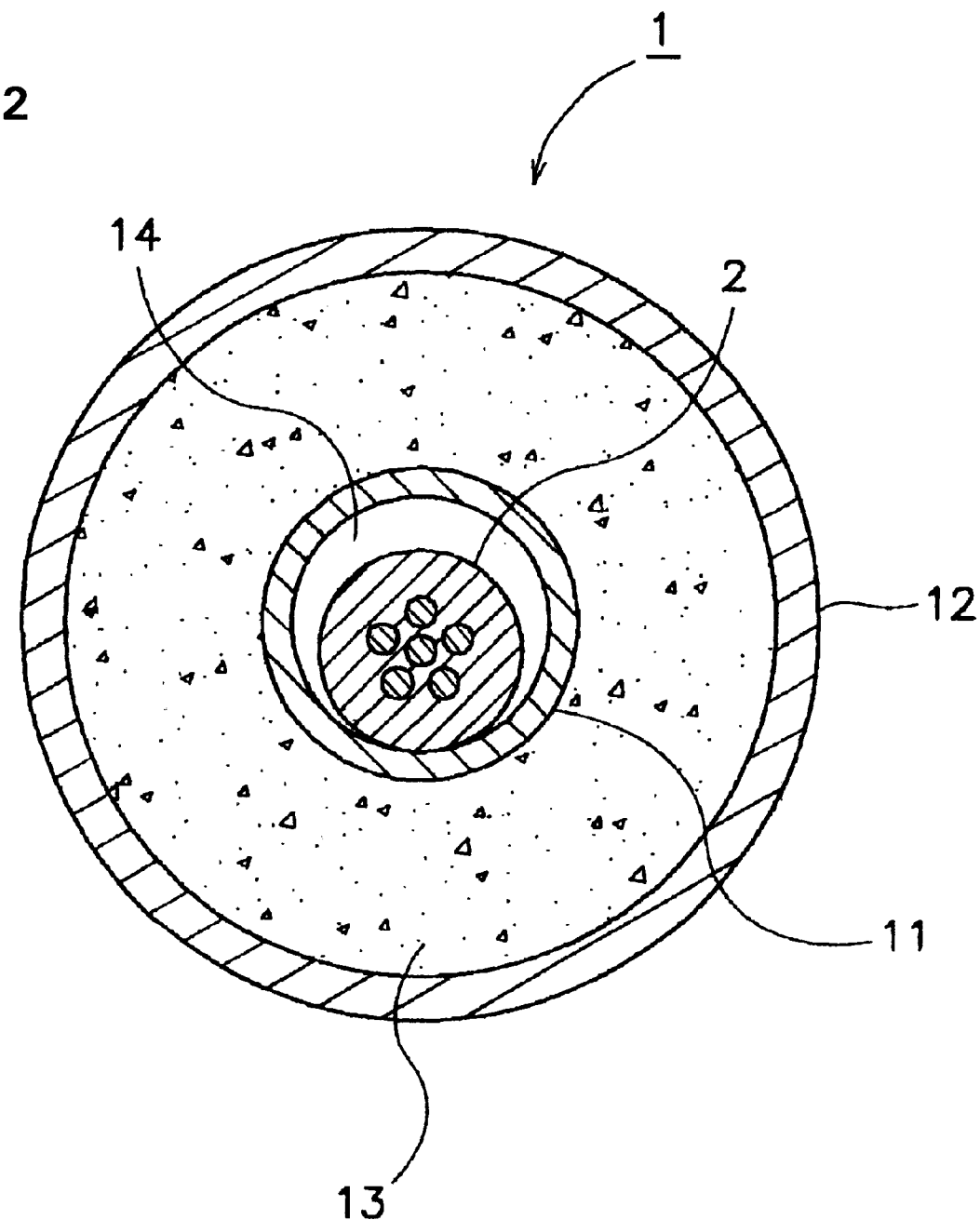
FIG. 2 is a transverse cross-sectional view of a heat radiating pipe.

Referring to FIG. 2, heating pipe 1 is formed as a two-layer pipe structure comprising an inner pipe 11 and an outer pipe 12. Inner pipe 11 is formed so that heating cable 2 can be loosely inserted therethrough. A hollow space is formed between inner pipe 11 and outer pipe 12. Rock particles 13 are sealed inside the hollow space. Rock particles 13 are distributed around inner pipe 11, and inner pipe 11 is positioned near the center of outer pipe 12. This allows heating cable 2 to be sealed from the outside atmosphere by inner pipe 11.

The heat dissipated inside inner pipe 11 is transferred to inner pipe 11 without any heat loss. The heat transferred to inner pipe 11 heats rock particles 13 and is dissipated outward from inner pipe 11. Heated rock particles 13 are also sealed from the outside atmosphere by outer pipe 12. After efficiently absorbing the heat, rock particles 13 transfer the heat to outer pipe 12. The heat is then dissipated from outer pipe 12, and this provides the heat from below the floor.

Heating cable 2 is loosely inserted through inner pipe 11. The two are not tightly fitted, and an air layer 14 is present. This air layer 14 does not immediately transfer the heat dissipated from the surface of heating cable 2 to inner pipe 11. Air layer 14 is disposed so that inner pipe 11 can be maintained at an adequately high temperature and so that the surface temperature of heating cable 2 can be prevented from decreasing.

Figure 3:
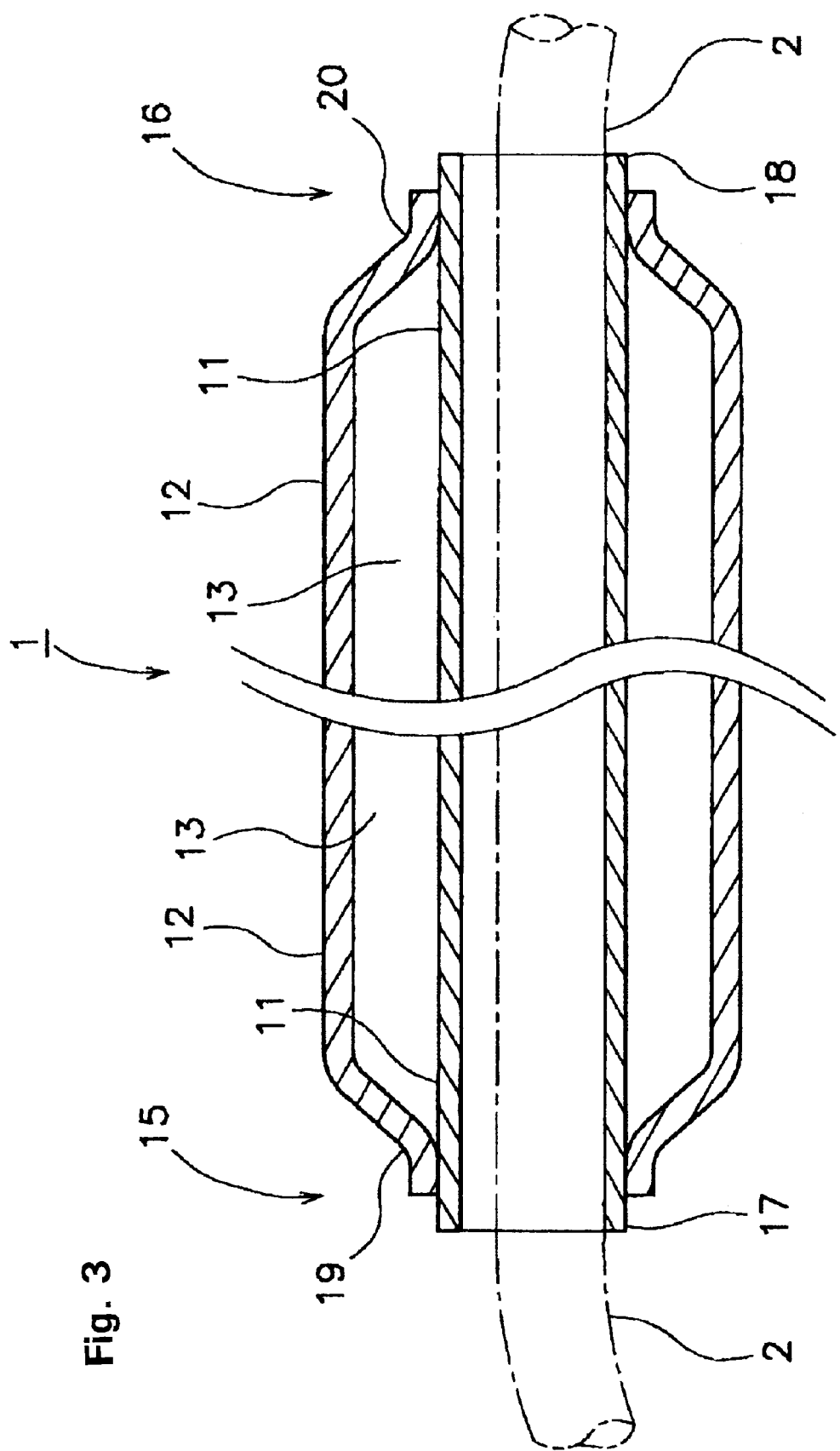
FIG. 3 is a vertical cross-sectional view of another form of heat radiating pipe.

The following is a description of an embodiment of a heat discharge pipe for use in floor heating. Referring to FIG. 3, heat discharge pipe 1 comprises outer pipe 12 and inner pipe 11, made from copper. The two are integrally formed by being connected at ends 15, 16. The inner diameter of inner pipe 11 is large enough to allow heating cable 2 to be loosely inserted therethrough. Ends 17, 18 are opened to allow heating cable 2 to be easily inserted. Outer pipe 12 is disposed so that it surrounds inner pipe 11, forming a hollow space 13 with inner pipe 11.

The connection between inner pipe 11 and outer pipe 12 at ends 15, 16 of heat discharge pipe 1 is formed simply by welding and does not serve the purpose of sealing hollow space 13. The connection is provided solely to allow inner pipe 11 and outer pipe 12 to be formed integrally. Of course, when sand or the like is to be sealed in hollow space 13, the space would need to be sealed tight enough to prevent the sand from flowing out. Ends 19, 20 of outer pipe 12 are formed with an opening large enough that they come into contact with the outer surface of inner pipe 11. Open ends 19, 20 are welded to the outer surface of inner pipe 11 to form heat discharging pipe 1 as an integral two-layer pipe structure. Alternatively, open ends 19, 20 of outer pipe 12 can be mechanically deformed so that they come into contact with the outer surface of inner pipe 11. In this case, welding can be performed as described above, or open ends 19, 20 can be deformed so that a tight contact is formed.

In either case, an integral structure can be achieved. Hollow space 13 can be left empty, or it can be filled and sealed with sand, stone particles, a mixture of sand and stone particles, concrete or the like. The material placed in hollow space 13 can be selected to provide desired heating or cooling speeds for the floor temperature.

Figure 4:
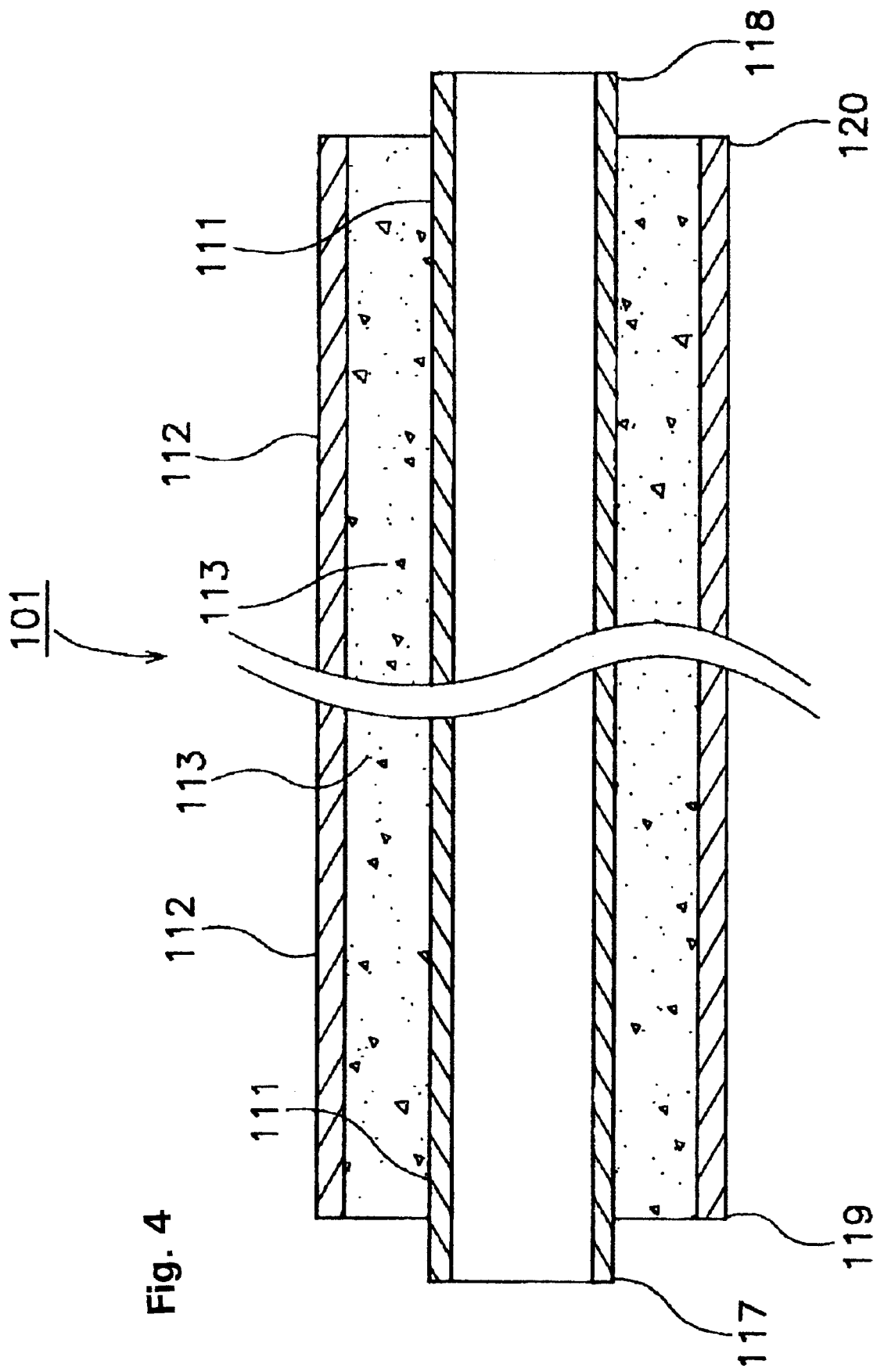
FIG. 4 is a vertical cross-sectional view of another embodiment of a heat radiating pipe.

The following is a description of a second embodiment of the heat discharging pipe used in floor heating and depicted in FIG. 4. In this embodiment, an inner pipe 111 is inserted into an outer pipe 112 and is fixed by concrete 113 formed between pipes 111, 112. Inner pipe 111 and outer pipe 112 are formed integrally. Since concrete 113 is hardened and does not flow, ends 119, 120 of outer pipe 112 do not need to be in contact with inner pipe 111. Concrete 113 also serves as an adhesive agent between inner pipe 111 and outer pipe 112. Thus, pipes 111, 112 can be integrally formed solely with concrete 113. Ends 117, 118 of inner pipe 111 are formed so that they project and open outward from concrete 113.

Other embodiments can be implemented by adding various modifications without departing from the spirit of the invention. For example, copper can be used for just one of either inner pipe 11, 111 or outer pipe 12, 112. Also, when hollow space 13 is empty (no sand or the like is present), it would be possible to imagine that inner pipe 11 is a material that has good heat transfer properties, and eliminate pipe 11 and insert heater cable 2 through outer pipe 12.

Tests were performed to observe the changes in the floor surface when the floor-heating method described above is used. The following two types of floor-heating systems were used for the experiment.

(1) A heating cable having a diameter of 5.4 mm was inserted through copper pipes having an outer diameter of 15.88 mm. The pipes were then arranged parallel to each other at 150 mm intervals in grooves formed on a styrofoam panel. A lead-plated iron plate having a thickness of 0.6 mm was laid directly on top of the pipes. Flooring material having a thickness of 15 mm was then laid.

(2) A heater cable having a diameter of 5.4 mm (same as in (1)) was inserted through an inner pipe having an outer diameter of 9.52 mm. The inner pipe and the heater cable were inserted through an outer pipe made of copper and having an outer diameter of 22.30 mm. The hollow space between the inner pipe and the outer pipe was filled with stone particles (gravel), and the resulting structures were arranged parallel to each other at 150 mm intervals along grooves formed in a styrofoam panel. A lead-plated iron plate having a thickness of 0.6 mm was laid directly on top of the pipes. Flooring material having a thickness of 15 mm was then laid.

A CN756A100 thermistor from Yamabu Honeywell Corp. Ltd. was used in the experiments. The temperature was kept within a prescribed range by turning the power to the heating cable on and off while measuring the temperature of the upper surface of the pipes. The changes in temperature and the surface temperature of the flooring material (floor) was recorded using a recording instrument UT187-16-12 from Ouyoudenshi Kogyo Corp. Ltd. The surface temperature of the flooring material was measured at two points: a point directly above the pipes (floor 1); and a position midway between adjacent, parallel pipes (floor 2). These measurements made it possible to indentify variations in the surface temperature of the flooring material.

Figure 5:
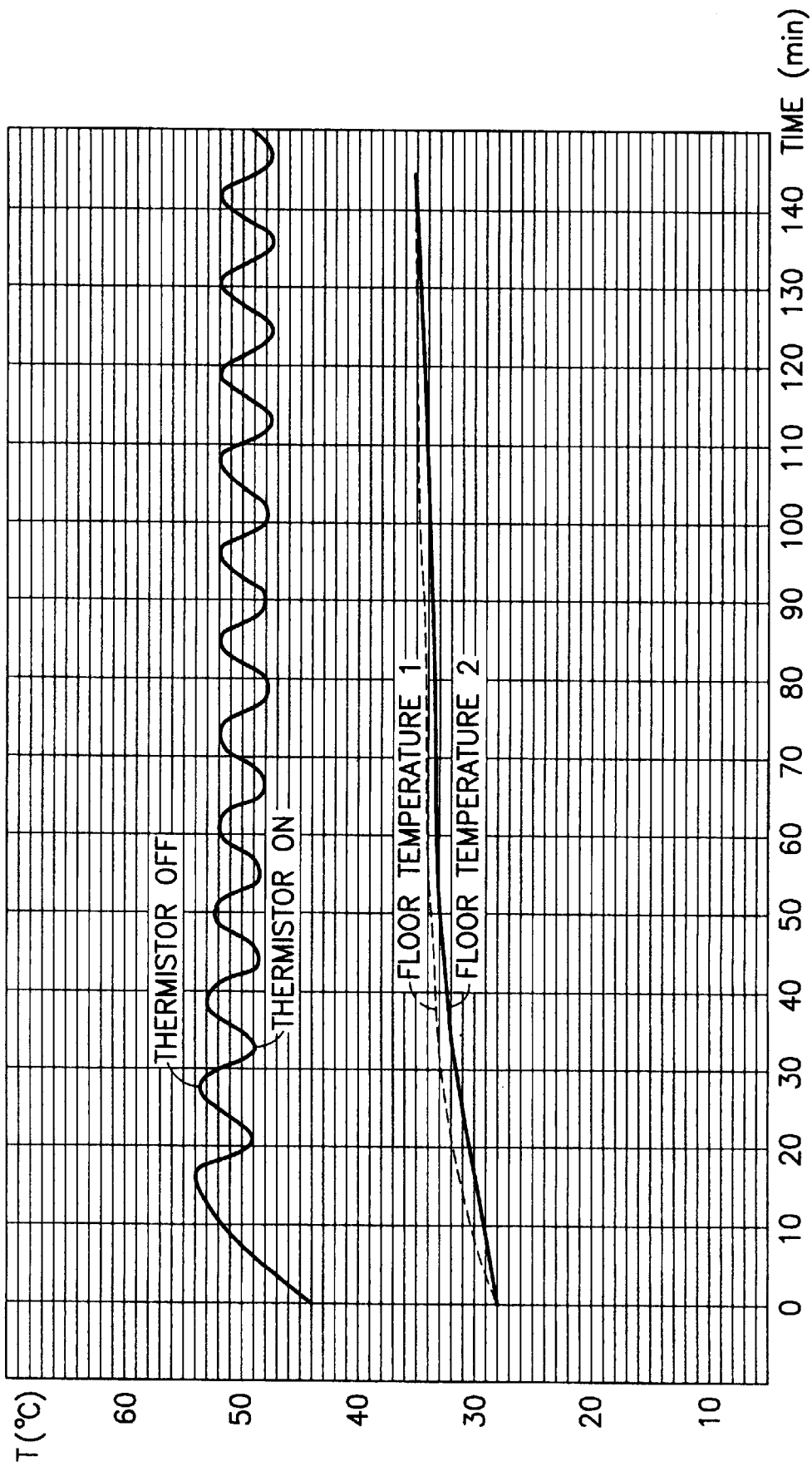
FIG. 5 is a graph showing heating pipe and floor temperature variations over time using a conventional heating structure.

The results from the set-up in (1) is as shown in FIG. 5.

The results from FIG. 5 indicate that the temperature variation between floor temperature 1 and floor temperature 2 was approximately 1 degree, and the temperature at the surface of the flooring material varied gradually, which is appropriate for floor heating. Also, the turning on and off of power to the heating cable by the thermistor sensor was repeated at approximately 6 minute intervals. The surface temperature increased rapidly when power was turned on, indicating how quickly heating starts up. Also, with the set-up in (1), the variations in the temperature of the pipes are steep. Thus, when the power to the heating cable is cut off, the temperature at the surface of the pipes goes down, but the power to the heating cable is turned back on before the temperature at the surface of the flooring material changes significantly. This makes it relatively easy to control the temperature.

Figure 6:
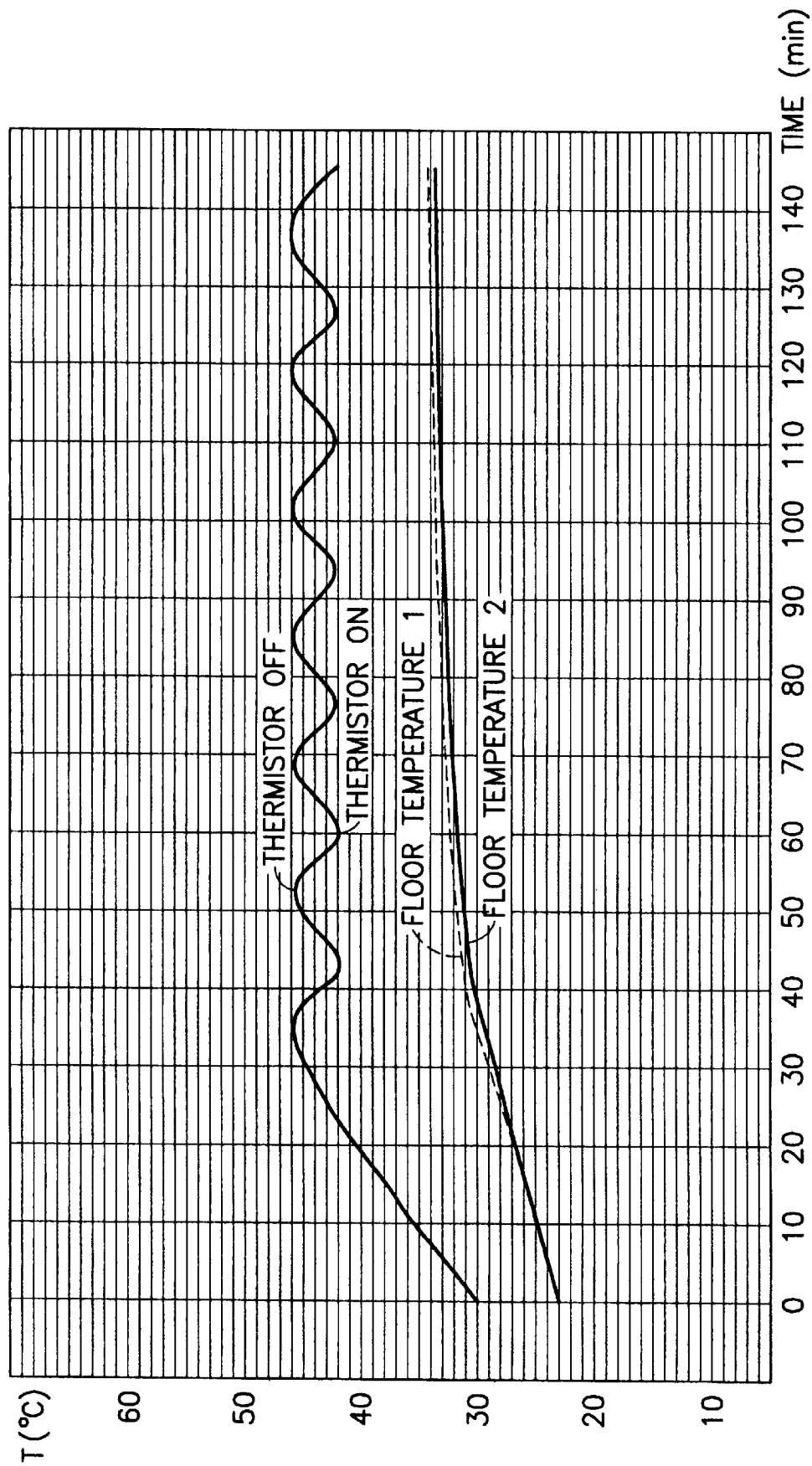
FIG. 6 is a graph showing heating pipe and floor temperature variations over time using a heating structure according to the present invention.

The results from the set-up in (2) is shown in FIG. 6.

Based on the results from FIG. 6, the difference between floor temperature 1 and floor temperature 2 is 1 degree or less. Compared to Table 1 above, the difference is not as large during the time the temperature is rising. Thus, this set-up is more suited for floor heating than the set-up in (1) above. Also, the cycling of power to the heating cable by the thermistor sensor takes place at close to 10 minute intervals. This provides more gradual changes in temperature, again making this set-up more suited for floor heating.

Also, the difference between the temperature at the surface of the pipes and the surface of the flooring material is smaller than that from FIG.5, indicating that the heat dissipated from the heating cable is being used more efficiently.

In the present invention as described above, a heat radiating pipe is installed at a prescribed position under a floor. Inside the heat radiating pipe there is a loosely inserted heating cable as well as an air layer. The air layer within the heat radiating pipe serves to insulate the heating cable. This insulation prevents the surface of the heating cable from cooling and provides efficient heating from the heating cable. When the air layer is heated to a sufficiently high temperature, the heat is transferred from the heat radiating pipe to the bottom of the floor, thus heating the floor. This configuration provides easier and quicker installation of the floor-heating device of the present invention. Also, no sealing structure is required since no water or heat medium fluids are used.

The present invention also relates to a heat radiating pipe installed at a prescribed position under a floor. The heat radiating pipe comprises an inner pipe through which a heating cable is loosely inserted, an outer pipe surrounding the inner pipe, and an empty layer formed from the empty space between the inner pipe and the outer pipe. The inner pipe insulates the heating cable. When the temperature of the inner pipe increases, the air in the empty layer around the inner pipe is heated. This air from the empty layer transfers the heat to the outer pipe, which provides heat under the floor.

Furthermore, the present invention also relates to a heat radiating pipe comprising an inner pipe having an inner diameter that allows a heating cable to be loosely inserted, and an outer pipe surrounding the inner pipe while maintaining an empty space between the inner pipe and the outer pipe. The inner pipe and the outer pipe are formed integrally. The heat radiating pipe comprising the integrally formed inner and outer pipes is laid under the floor in a prescribed area, and the heating cable is passed through the inner pipe. This makes it possible to install the floor heating system very easily. Also, since the inner pipe and the outer pipe of the heat radiating pipe are formed integrally in the shape of a rod, they can be shipped in the same manner as PVC pipes or iron pipes, and will be familiar to the workers performing the installation. Furthermore, different lengths of the pipe can also be prepared. This makes it possible to have pipes prepared for rooms of various standard sizes.

When sand is sealed inside the hollow section described above, the heat dissipated from the inner pipe is first absorbed by the sand in the hollow section. When the power to the heating cable is turned off, the inner pipe temperature will begin to decrease. However, the heat radiation from the sand will prevent the temperature below the floor and at the floor surface from decreasing. When rock particles are sealed in the hollow space, the amount of air present in the hollow space is somewhat greater than when sand is used. This decreases the amount of heat absorbed by the rock particles. A mixture of sand and rock particles will result in heat absorption midway between the above two examples.

When concrete is poured in the hollow section, the concrete will serve to hold heat unlike with sand or rock particles. The concrete will store the heat radiated from the inner pipe and radiate it to the outer pipe, providing for gradual changes in the overall temperature of the heat radiating pipe. When either the inner or the outer pipe is made from copper, the temperature of the heating cable can be prevented from rising excessively since heat is stored inside the heat radiating pipe. Also, the difference in temperature between the heating cable and the floor surface can be decreased, thus making it easier to control the temperature.

What is claimed is:

1. A floor-heating method comprising:

loosely inserting a heating cable in an inner pipe;

surrounding said inner pipe with an outer pipe spaced outwardly from said inner pipe thereby forming a space between said inner pipe and said outer pipe;

placing sand in said space; and positioning the resulting heating cable, inner pipe, and outer pipe combination at a prescribed position under a floor.

2. A floor-heating method according to claim 1 wherein: at least one of said inner pipe and said outer pipe is a copper pipe.

3. A heat radiating pipe for use in floor heating comprising:

an inner pipe having a first diameter;

an outer pipe spaced outwardly from said inner pipe thereby forming a space between said inner pipe and said outer pipe;

a heating cable loosely inserted into said inner pipe; and a sand layer between said inner pipe and said outer pipe.

4. A heat radiating pipe for use in floor heating according to claim 3 wherein:

at least one of said inner pipe and said outer pipe is a copper pipe.

5. A floor heating method in which a power supply of a heater cable is controlled with a control device working in conjunction with a temperature sensor to thereby adjust a heating temperature, comprising:

loosely inserting a heating cable in an inner pipe;

surrounding said inner pipe with an outer pipe spaced outwardly from said inner pipe thereby forming a space between said inner pipe and said outer pipe;

placing sand in said space; and positioning the resulting heating cable, inner pipe, and outer pipe combination at a prescribed position under a floor.

6. A floor heating method according to claim 5, in which a power supply of a heater cable is controlled with a control device working in conjunction with a temperature sensor to thereby adjust a heating temperature, wherein at least one of said inner pipe and said outer pipe is a copper pipe.

* * * * *

UNITED STATES PATENT AND TRADEMARK OFFICE
CERTIFICATE OF CORRECTION

PATENT NO.      : 6,018,138                                              Page 1 of 1
DATED           : January 25, 2000
INVENTOR(S)     : Yasuo Kurita It is certified that error appears in the above-identified patent and that said Letters Patent is hereby corrected as shown below:

Title page,
Please add
-- [56]      References Cited

U.S. PATENT DOCUMENTS

| | | |
|---|---|---|
| 3,069,522 | 10/1960 | Jamison |
| 3,622,748 | 11/1971 | Sellers |
| 2,503,601 | 4/1950  | Tice |
| 4,461,347 | 7/1984  | Layton et al. |
| 4,997,124 | 3/1991  | Kitabatake et al. |
| 4,284,130 | 8/1981  | Elias |
| 4,163,440 | 8/1979  | Stultz |
| 4,026,273 | 5/1977  | Parker |
| 4,567,350 | 1/1986  | Todd |
| 1,549,773 | 8/1925  | Hynes |
| 2,018,293 | 10/1935 | Williams et al. -- |

Signed and Sealed this

Twelfth Day of November, 2002

Attest:

Attesting Officer

JAMES E. ROGAN
*Director of the United States Patent and Trademark Office*